United States Patent [19]
Milligan

[11] Patent Number: 6,152,155
[45] Date of Patent: Nov. 28, 2000

[54] FILTER CLEANING DEVICE

[76] Inventor: Lon Milligan, 2980 NE. Denn Ave., Roseburg, Oreg. 97470

[21] Appl. No.: 09/200,983
[22] Filed: Nov. 30, 1998
[51] Int. Cl.[7] ..................................................... B08B 3/02
[52] U.S. Cl. ......................... 134/138; 134/153; 134/157; 134/152; 211/163
[58] Field of Search ................................... 134/137, 138, 134/140, 141, 152, 153, 157; 211/163

[56] References Cited

U.S. PATENT DOCUMENTS

| | | |
|---|---|---|
| 787,950 | 4/1905 | Sharples . |
| 2,755,583 | 7/1956 | Leob . |
| 3,070,103 | 12/1962 | Puckard et al. . |
| 3,075,534 | 1/1963 | Habostad . |
| 3,139,189 | 6/1964 | Kolairk . |
| 3,428,060 | 2/1969 | Spivey . |
| 3,650,283 | 3/1972 | Lang . |
| 3,873,364 | 3/1975 | Smith . |
| 5,031,779 | 7/1991 | Szenay . |
| 5,074,421 | 12/1991 | Coulter . |
| 5,095,928 | 3/1992 | Phipps . |
| 5,330,065 | 7/1994 | Bradley . |
| 5,337,769 | 8/1994 | Howe . |
| 5,363,869 | 11/1994 | McDowell . |
| 5,384,045 | 1/1995 | Chmielewski et al. . |
| 5,402,808 | 4/1995 | Wallis et al. . |
| 5,409,027 | 4/1995 | Glunt . |
| 5,507,060 | 4/1996 | Quimpo ................................. 134/138 |
| 5,597,002 | 1/1997 | Stanley, Jr. et al. . |
| 5,989,419 | 11/1999 | Dudley et al. ........................... 134/152 |

FOREIGN PATENT DOCUMENTS

WO 93/24337  12/1993  United Kingdom .

Primary Examiner—Frankie L. Stinson
Attorney, Agent, or Firm—Richard C. Litman

[57] ABSTRACT

A filter cleaning device having a base with a central aperture. A threaded male and female vertical post is coupled together as a single combination post and is mechanically fastened to the base within the central aperture. A filter is insertably retained on the combination post and adjusted vertically by a mechanical coupler which releasably secures the filter for effective cleaning. The filter rests on a rotatable disc which is insertably attached to the combination base and post assembly. The disc has a channel having a number of bearings to produce a rotating interface the filter and the base. The base is a hollow reservoir and has a channel for inserting weighting material such as water or sand to reduce toppling from moment induced forces. The volume of the base is maximized by a minimizing the depth by which the male post in particular is disposed within the base a predetermined distance. A channel cap is fastened to the channel to prevent spillage of the weighting material. The filter cleaning device is light weight and simple to use.

20 Claims, 4 Drawing Sheets

FILTER CLEANING DEVICE

BACKGROUND OF THE INVENTION

1. Field of the Invention

The present invention relates generally to filter cleaning devices. More specifically, the invention is a pool and spa filter cleaning device which requires minimum effort to assemble and use.

2. Description of the Related Art

Various devices have been devised for cleaning pool or spa filters or other objects such as paint rollers, etc., primarily to reduce contamination and the work required for clean-up or maintenance. Although of secondary importance, the level of difficulty required to assemble a particular cleaning device for the mechanically challenged, has been on many occasions the sole reason for one abandoning the idea of purchasing a cleaning device for reusing filters or paint rollers at all. In the pool and spa industry, for example, reusable filters are unfathomable to say the least, because the task required for cleaning these elements is messy and labor intensive. Not only is clothing often ruin from various chemicals such is chlorine, bromine, etc., but there are medical concerns as well.

A user often runs the risk of contracting various skin irritations or conditions from various bacteria prevalent in pool and spa filter systems. As with reusable paint rollers, the time and effort required by the novice or professional alike to clean these or similar objects have proven to be costly and inefficient. Thus, only one having a significant amount of experience working in either of the aforementioned industries would know the particular advantages of using a cleaning device which aids in producing clean filters or paint rollers without the problems noted above. The filter cleaning device according to the instant invention is simple to use and cleans and spin dries filters or paint rollers with minimal effort required by a user to do the same with similar conventional devices. A number of U.S. Patents and other documents have been reviewed in this particular technological area, however, these documents fail to provide the advantages of the instant invention as herein described.

For example, U.S. Pat. No. 3,428,060 issued to Spivey discloses an apparatus for cleaning paint rollers comprising a housing, an unadjustable central mount for a paint roller and a base with a central hub having a plurality of vanes which rotate in response to a jet of water. An interior wall portion of the housing has mounted therein a water input system. This water system includes a cylindrical channel disposed perpendicular and in parallel with a respective roller. A plurality of apertures are uniformly disposed along the length of the channel for producing a respective single stream of water to a particular area on a roller. This type of system often suffer from clogging from paint dispersion within the device. In addition a user would be required to constantly clean the device to prevent clogging or paint hardening within various apertures.

The filter cleaning device according to the instant invention avoids these particular problems in that it does not require a housing or a water system as disclosed by Spivey. Furthermore, the filter cleaning device according to the instant invention is an adjustable filter cleaning device for filters of various lengths. The following U.S. Patents and respective Foreign documents taught by Smith (U.S. Pat. No. 3,873,364), Phipps (U.S. Pat. No. 5,095,928), Howe (U.S. Pat. No. 5,337,769), McDowell (U.S. Pat. No. 5,363,869), Glunt (U.S. Pat. No. 5,409,027), Wallis et al. (U.S. Pat. No. 5,402,808), Stanley, Jr. et al. (U.S. Pat. No. 5,597,002) and Ward (WO 93/24337) disclose similar features to that disclosed by Spivey and are of general relevance to the filter cleaning device according to the instant invention.

U.S. Pat. No. 3,650,283 issued to Lang discloses a filter cleaning apparatus which works based on a similar principle to that taught by Spivey, except the device is a filter cleaning device which cleans filters used in carburetors of internal combustion engines. Unlike the water system for the device taught by Spivey, the filter cleaning device of Lang requires an additional tank connection for receiving cleaning fluid and an additional means for transporting the fluid within the filter and water system housing. These features are obviated by the filter cleaning device according to the instant invention, in that, it is a stand alone device which does not require complex water system connections.

U.S. Pat. No. 5,384,045 issued to Chmielewski et al. discloses a filter cleaner for swimming pools comprising a journal for rotating a filter about a vertical array of nozzles. Water spray action occurs within the housing and sprays radially outward towards an interior wall of a respective filter. This device is completely different from the device taught by the instant invention.

U.S. Pat. No. 5,330,065 issued to Bradley discloses a cartridge filter cleaning rotatable rack which has similar features to the filter cleaning device according to the instant invention. A vertically positioned cartridge filter is securely mounted onto a rotatable wash rack and is held in a stationary mode as the frontal exposed area is washed clean by a hand held jet-nozzled water hose. The filter unit is then revolved via a rotatable holding plate. One critical feature lacking in this particular filter cleaning device, but taught by the instant invention is the use of a coupling means for adjusting the filter cleaning device to accommodate various filters lengths. In addition the base is designed to maximize the volume thereby reducing moment induced toppling of the device directly related to filter size and forces produced by water pressure jets.

The filter cleaning device particularly for pool and spa filter systems is different from the prior and related art, in that it provides simple and easy adjustable filter cleaning device for filters having different length dimensions. A threaded male and female post are coupled as a single combination post for retaining filters centrally disposed within a base. The male post is disposed within a central aperture which maximizes the volume of the base to reduce moment induced toppling of the device. In th regard, none of the above inventions and patents, taken either singularly or in combination, is seen to describe the instant invention as claimed. Thus, a filter cleaning device solving the aforementioned problems is desired.

SUMMARY OF THE INVENTION

The filter cleaning device according to the invention has a base with a central aperture. A threaded male and female vertical post is coupled together as a single combination post and is mechanically fastened to the base within the central aperture. A filter is insertably retained on the combination post and adjusted vertically by a mechanical coupler for effective cleaning. The filter rests on a rotatable disc with bearings insertably attached to the combination base and post assembly. The base is a hollow reservoir and has a channel for inserting weighting material such as water or sand to reduce toppling from moment induce forces. The male post in particular is disposed within the base to substantially maximize its volume. A channel cap is fastened to the channel to prevent spillage of the weighting material. The filter cleaning device is light weight and simple to use.

Accordingly, it is a principal object of the invention to provide a filter cleaning device which accommodates filters for pools and spas having significantly different lengths or spatial dimensions.

It is another object of the invention to provide a filter cleaning device which is light-weight and simple to use.

It is a further object of the invention to provide a filter cleaning device which significantly reduces moment induced toppling while in use.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a filter cleaning device particularly for pool and spa filter systems, but can be used for paint rollers or similar objects as well. The preferred embodiment of the present invention is depicted in FIGS. 1–4, and is generally referenced by numeral 5. As diagrammatically illustrated in FIG. 1, an environmental view of the invention according to the preferred embodiment is shown wherein a user U directs cleaning fluid or water F from a jetted-nozzle J and hose H onto the filter cleaning device 5 with minimal effort.

Figure 1:
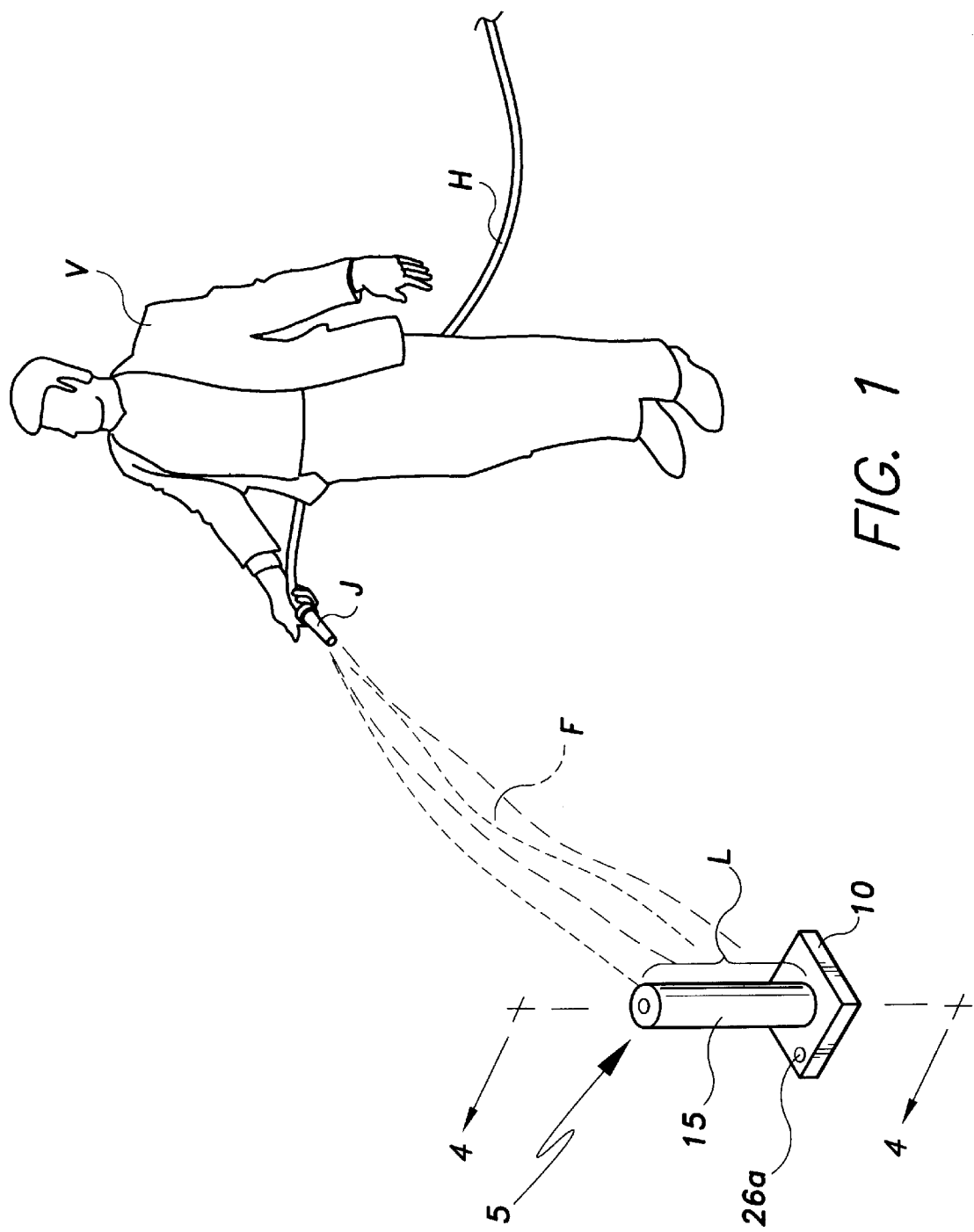
FIG. 1 is an environmental, perspective view of a filter cleaning device according to the present invention.
Figure 2:
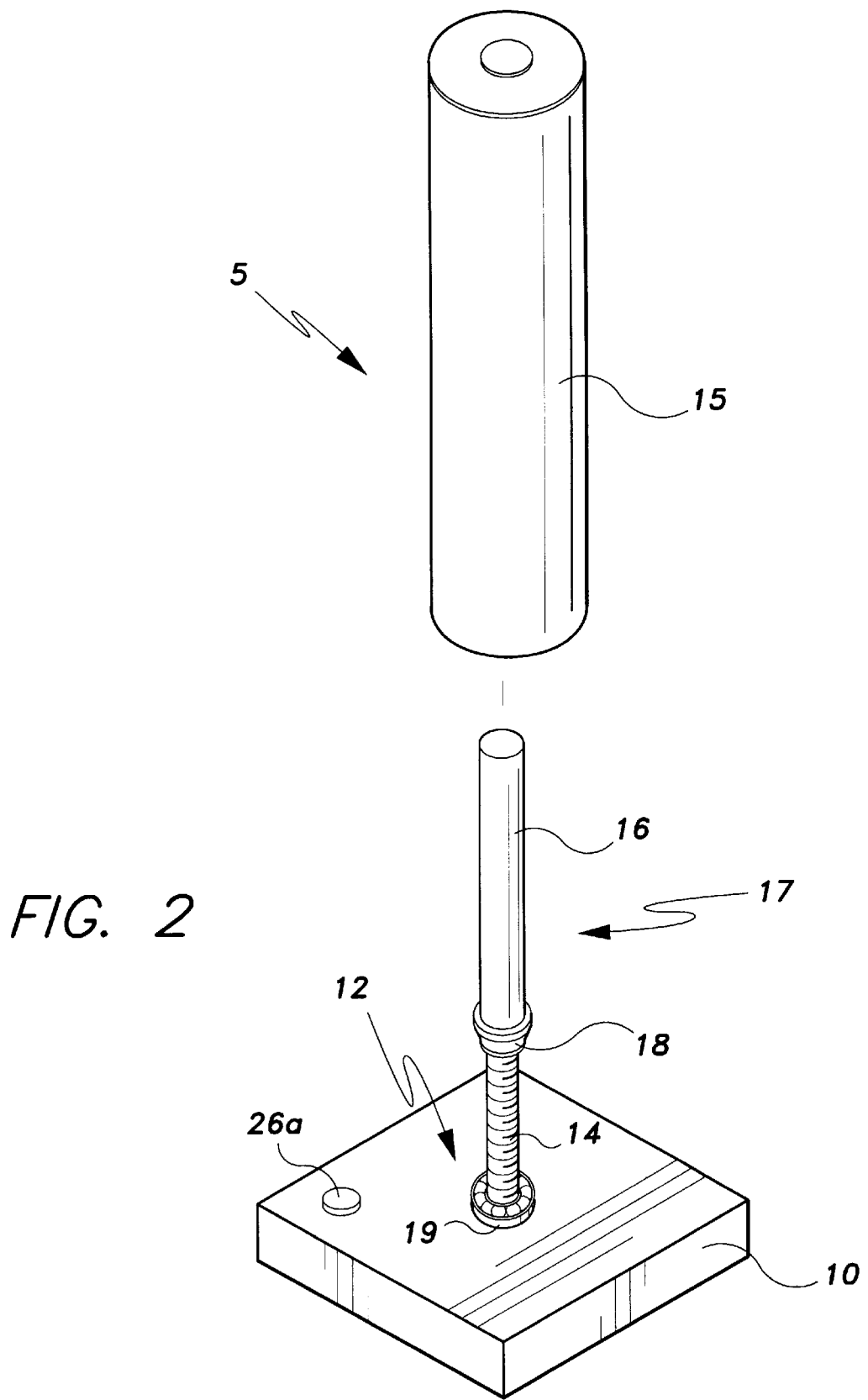
FIG. 2 is an exploded perspective view of the filter cleaning device, illustrating the alignment of a filter with a vertical post according to the invention.
Figure 3:
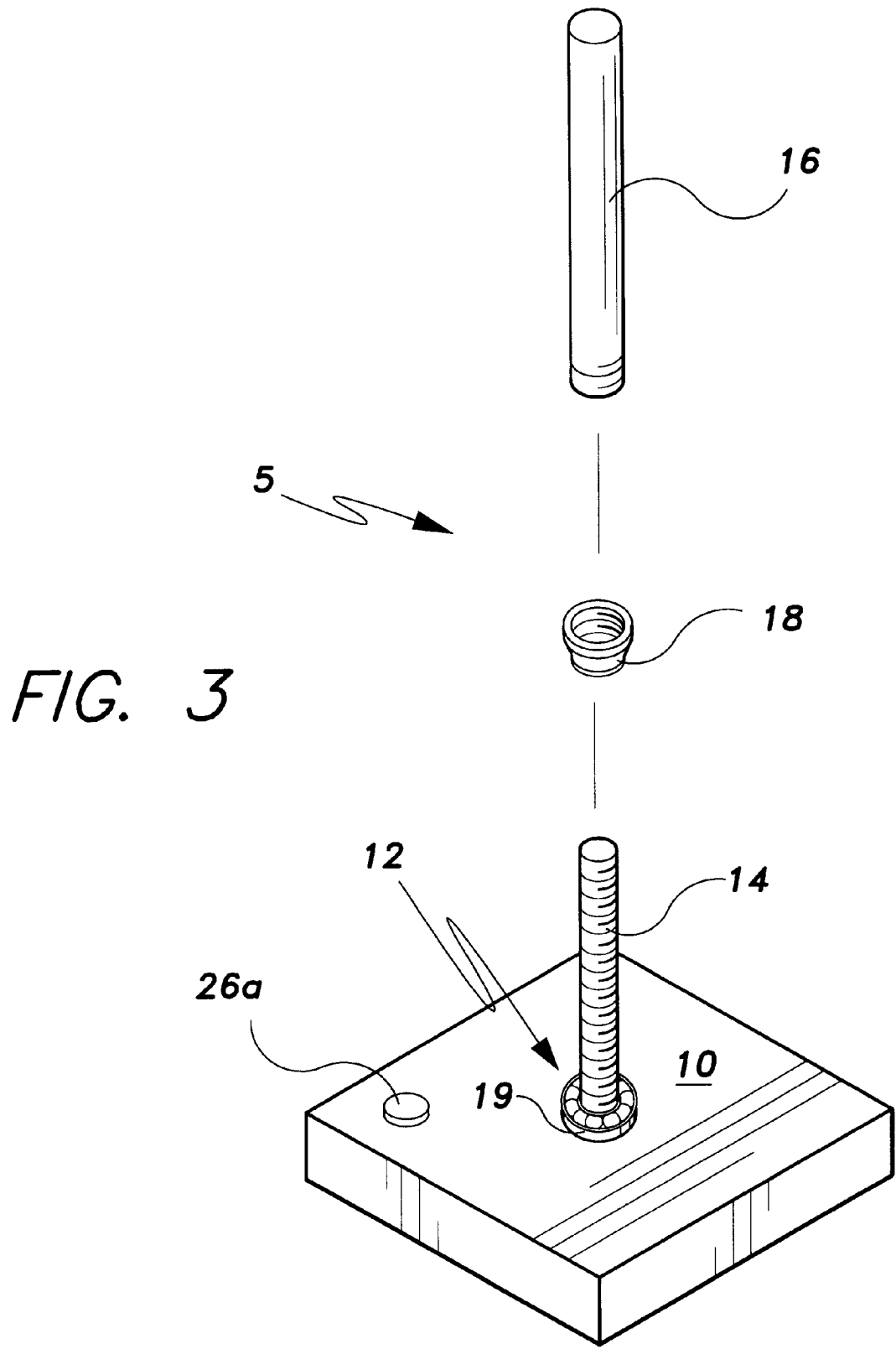
FIG. 3 is an exploded perspective view of the filter cleaning device, illustrating the alignment of a combination male and female connector according to the invention.
Figure 4:
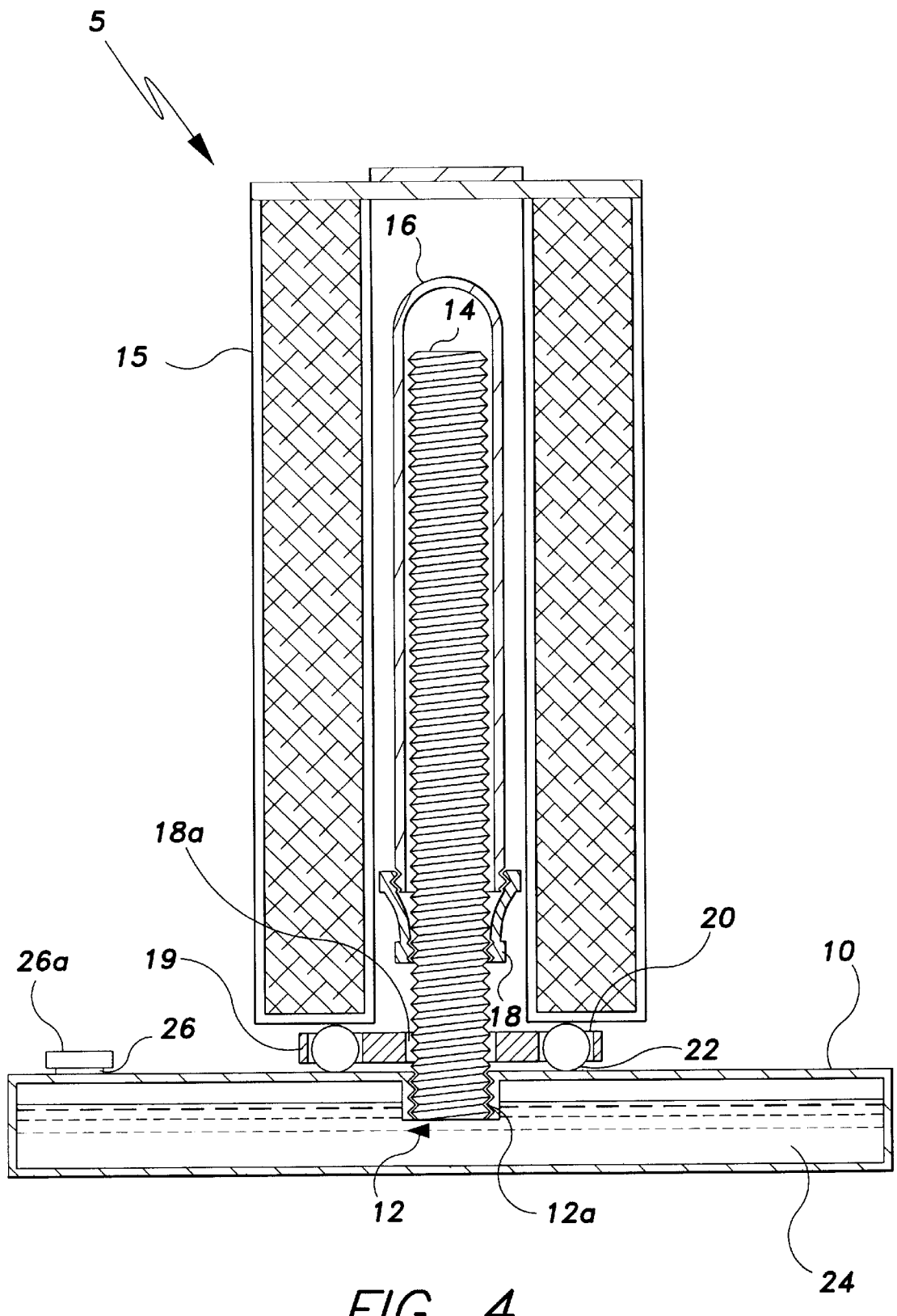
FIG. 4 is a cross-sectional view of the filter cleaning device, illustrating a rotating filter element according to the invention.

As best seen in FIGS. 2–4, the filter cleaning device comprises a hollow base 10 having a central aperture 12, at least a first post 14 and a second post 16, a coupling means 18 for coupling the first and second post 14, 16 posts as a single combination post 17. The combination post 17 serves to retain a filter 15 having different lengths or spatial dimensions in a position substantially perpendicular to the base 10. The central aperture 12 of the base 10 further comprises an attachment means 12a for attaching the first post 14 to the base 10. The preferred method of attachment is by threaded male and female mechanical fasteners. The pitch and depth of the threaded central aperture 12 are predetermined to maximize reservoir volume of the base 10.

As diagrammatically illustrated in FIG. 4, a rotating means 19 having a central aperture 19a is insertably attached to the first post 14. While not shown in FIGS. 2 and 3, but clearly shown in FIG. 4 in cross-section, the rotating means or disc 19 has a first surface 20 in abutment relation with a portion of the filter 15 and a second surface 22 in abutment relation with a portion of the base 10 for producing a rotatable interface for spinning a filter 15.

Accordingly, the base 10 further comprises a reservoir or hollow cavity for weighting material 24. The preferred weighting material 24 is water since it is easy to use and evaporates as an environmentally friendly fluid with virtually no need for subsequent clean-up. However, in the event a stronger base 10 is needed, sand and/or granular pebbles can be used to reduce moment induced toppling of the device 5. The water or cleaning fluid F from a jetted-nozzle J has been found to produce a force F which creates a substantial moment particularly for tall filters (having a moment arm of length L) which can cause the device to topple. This is obviated by maximizing the reservoir volume of the base 10 to include a significant increase in weighting material 24 therein to stabilize the device 5.

The base 10 further comprises an open channel 26 for filling the base 10 with weighting material 24. The channel 26 further incudes a channel cap 26a for sealing and preventing spillage of the weighting material 24 from the channel 26. With more particularity, the filter cleaning device 5 according to FIGS. 2–4, diagrammatically illustrates the-first post 14 as a threaded male post, wherein the threads 14a extend substantially along the length of the post 14. The second post 16 is a hollow female post having a larger diameter d than the diameter d of the first post 14. The female post 16 further comprises external threads 16a disposed on a peripheral surface S having a predetermined pitch along a predetermined length of the post female post 16. A coupling means 18 has a substantially tapered cylindrical configuration. The coupling means 18 further comprises a first and second internal threads 18a, 18b having a predetermined pitch and depth for respectively attaching the first 14 and second 16 posts thereto as a single integrated post 17. In operation, the filter 15 having a substantially cylindrical configuration is inserted onto the single post 17 and rests or abuts with the surface 20 of the rotating means 19. The rotating means 19 includes channels 19b having a plurality of ball bearings 19c disposed therein. Each bearing 19c is weighted to maintain rolling contact with each respective abutting surface as described above. Another particular advantage of the filter cleaning device 5 according to the invention is that the complete structure is made of plastic material. This material can include any range of plastics such as selective hard plastics or a composite plastic material. It would be obvious to one of ordinary skill in the art to select a plastic according to predetermined weight capacity and material life according to the intended use of the device. The use of plastic material in particular makes the device 5 impervious to material degradation due to weather effects such as moisture and/or humidity etc.

It is to be understood that the present invention is not limited to the embodiments described above, but encompasses any and all embodiments within the scope of the following claims.

I claim:

1. A filter cleaning device comprising:
 a base having a central aperture, at least a first and second post, a coupling means for coupling said first and second posts as a single combination post and filter retainer, the central aperture of the base further comprises an attachment means for attaching at least one of said first and second posts to said base, and
 a rotating means having a central aperture for insertable attachment with the first post, and further comprising a first surface for abutment with a filter, and a second surface for abutment with the base, said respective abutting surfaces thereby producing a substantially frictionless interface for maximizing filter rotation and cleaning in response to a jet of cleaning fluid applied thereto.

2. The filter cleaning device according to claim 1, wherein said base is a reservoir, wherein said reservoir further comprises removable weighting material for stabilizing the base.

3. The filter cleaning device according to claim 2, wherein said base further comprises an open channel for filling said reservoir with weighting material.

4. The filter cleaning device according to claim 3, wherein said channel further incudes a channel cap for sealing and preventing spillage of said weighting material from the channel.

5. The filter cleaning device according to claim 4, wherein said weighting material is water.

6. The filter cleaning device according to claim 4, wherein said weighting material is sand.

7. The filter cleaning device according to claim 2, wherein said attachment means is a threaded aperture for screwing in a post.

8. The filter cleaning device according to claim 7, wherein said threaded aperture is defined by a predetermined pitch and depth and disposed within a central portion of the reservoir, wherein said depth is chosen to maximize the volume of the reservoir.

9. The filter cleaning device according to claim 1, wherein said first post is a threaded male post, wherein said threads extend substantially along the length of the post.

10. The filter cleaning device according to claim 1, wherein said second post is a hollow female post having a larger diameter than the first post, said female post further comprising external threads disposed on a peripheral surface of the post having a predetermined pitch along a predetermined length of said peripheral surface of the female post.

11. The filter cleaning device according to claim 1, wherein said coupling means is shaped having a substantially tapered cylindrical configuration.

12. The filter cleaning device according to claim 11, wherein said coupling means is an adjustable coupling means further comprises a first and second internal threaded aperture having a predetermined pitch and depth for respectively attaching said first and second posts therein, and vertically adjusting the second post vertically along the length of the first post.

13. The filter cleaning device according to claim 1, wherein said rotating means comprises a concentric channel having a plurality of ball bearings disposed therein.

14. The filter cleaning device according to claim 13, wherein said ball bearing are made of a plastic material.

15. The filter cleaning device according to claim 1, wherein said filter cleaning device is made of a plastic material.

16. The filter cleaning device according to claim 15, wherein said plastic material is a composite hard plastic material.

17. A filter cleaning device comprising:

a base having a central aperture, at least a first and second post, a coupling means for coupling said first and second posts as a single combination post and filter retainer, the central aperture of the base further comprises an attachment means for attaching at least one of said first and second posts to said base, said first post is a threaded male post, wherein said threads extend substantially along the length of the post, said second post is a hollow female post having a larger diameter than the first post, said female post further comprising external threads disposed on a peripheral surface of the post having a predetermined pitch along a predetermined length of said peripheral surface of the female post, and a rotating means having a central aperture for insertable attachment with the first post, and further comprising a first surface for abutment with a filter, and a second surface for abutment with the base, said respective abutting surfaces thereby producing a substantially frictionless interface for maximizing filter rotation and cleaning in response to a jet of cleaning fluid applied thereto.

18. The filter cleaning device according to claim 17, wherein said base is a reservoir, wherein said reservoir further comprises removable weighting material for stabilizing the base.

19. The filter cleaning device according to claim 17, wherein said base further comprises an open channel for filling said reservoir with weighting material, said channel further incudes a channel cap for sealing and preventing spillage of said weighting material from the channel.

20. The filter cleaning device according to claim 17, wherein said attachment means is a threaded aperture for screwing in a post.

* * * * *